United States Patent [19]

Langer et al.

[11] Patent Number: 5,330,672

[45] Date of Patent: * Jul. 19, 1994

[54] FABRIC CARE COMPOSITION COMPRISING WATER SOLUBLE OR WATER-DISPERSIBLE COPOLYMER CONTAINING UV-ABSORBING MONOMER

[75] Inventors: Matthew E. Langer, New City, N.Y.; Simon R. Ellis, Little Sutton, United Kingdom; John F. Hessel, Metuchen; Ferial Khorshahi, Leonia, both of N.J.; Russell J. Ward, Upton, United Kingdom

[73] Assignee: Lever Brothers Company, Division of Conopco, Inc., New York, N.Y.

[*] Notice: The portion of the term of this patent subsequent to Jan. 21, 2009 has been disclaimed.

[21] Appl. No.: 70,033

[22] Filed: May 28, 1993

Related U.S. Application Data

[63] Continuation of Ser. No. 731,596, Jul. 17, 1991, abandoned.

[51] Int. Cl.$^5$ ................................................ C11D 9/00
[52] U.S. Cl. ................................. 252/108; 252/588; 252/589
[58] Field of Search .................. 252/95, 98, 108, 588, 252/589; 424/60

[56] References Cited

U.S. PATENT DOCUMENTS

| | | | |
|---|---|---|---|
| 4,569,77 | 2/1986 | Ciallella | 252/8.6 |
| 3,600,350 | 8/1971 | Kwolek | 260/32.6 |
| 3,634,320 | 1/1972 | Metzner et al. | 260/45.85 R |
| 3,699,085 | 10/1972 | Johnson | 260/78 |
| 3,888,965 | 6/1975 | Kwolek | 264/342 |
| 3,959,230 | 5/1991 | Hays | 260/75 R |
| 4,153,744 | 5/1979 | Remley | 427/160 |
| 4,153,744 | 5/1979 | Remley | 427/160 |
| 4,401,649 | 8/1983 | Green | 424/60 |
| 4,460,373 | 7/1984 | Beavan | 8/103 |
| 4,702,857 | 10/1987 | Gosselink | 252/174.21 |
| 4,788,054 | 11/1988 | Bernhardt | 424/59 |
| 5,041,282 | 8/1991 | Sabatelli et al. | 424/59 |
| 5,082,578 | 1/1992 | Langer et al. | 252/8.7 |

FOREIGN PATENT DOCUMENTS

| | | |
|---|---|---|
| 2351892 | 4/1974 | Fed. Rep. of Germany . |
| 2538143 | 4/1976 | Fed. Rep. of Germany . |
| 55-137217 | 10/1980 | Japan . |
| 60-174710 | 9/1985 | Japan .................. 424/60 |

OTHER PUBLICATIONS

P. C. Crews et al, Test. Chem. Color 19 (11):21 (1987).
B. Milligan et al, Polymer, Degrad Stab. 10 (4):325 (1985).
I. F. Osipenko et al, Vesti Akad. Vanuk BSSR, Ser. Khim. Navuk 1:105 (1980).

*Primary Examiner*—Michael L. Lewis
*Assistant Examiner*—Timothy C. Vanoy
*Attorney, Agent, or Firm*—Ronald A. Koatz

[57] ABSTRACT

The present invention relates to novel fabric care compositions water containing dispersible or water-soluble copolymers which contain at least one UV-absorbing monomer and one hydrophilic monomer component.

20 Claims, No Drawings

FABRIC CARE COMPOSITION COMPRISING WATER SOLUBLE OR WATER-DISPERSIBLE COPOLYMER CONTAINING UV-ABSORBING MONOMER

This is a continuation application of Ser. No. 07/731,596, filed Jul. 17, 1991 now abandoned.

BACKGROUND OF THE INVENTION

1. Field of the Invention

The subject invention relates to fabric care compositions comprising novel water-dispersible or water-soluble copolymers which contain at least one UV-absorbing monomer and one hydrophilic monomer component. The copolymers used in these compositions may optionally contain a hydrophobic monomer component (i.e., if you have a water-soluble UV absorber, then you need hydrophobic groups to ensure it adsorbs). The compositions of the invention provide anti-fading and soil release benefits. Because of their UV absorbancy, the copolymers used in the composition of the invention could also be used in sunscreen compositions. The copolymers may also be used in other compositions such as may be recognized by those skilled in the art.

2. Prior Art

UV light induced fading of fabric is a major concern to those residing in areas of high solar intensity. A fabric care composition comprising an agent which could provide protection from solar ultraviolet radiation and thereby retard the rate of garment fading would therefore prove most useful to consumers living in tropical and sub-tropical climates.

To the applicants' knowledge, compositions comprising a UV absorbing monomer in combination with a hydrophilic monomer (which both delivers the copolymer into an aqueous system and also provides soil-release effect) are unknown.

More particularly, it is known, for example, that poly(ethylene terephthalate/poly(ethylene glycol) copolymers absorb onto hydrophobic surfaces to confer soil release properties (U.S. Pat. Nos. 4,702,857 to Procter & Gamble; 4,569,772 to Colgate Palmolive, and 3,959,230 to Procter & Gamble). These materials are believed to function by hydrophilicly modifying a hydrophobic surface such as oily soil on fabric or polyester fabric itself, deterring deposition of hydrophobic soils including body sebum. The poly(ethylene terephthalate) unit is believed to seek and adhere to the hydrophobic surface; the poly(ethylene glycol) portion is felt to give hydrophilic character to the fabric surface as well as aid the polymer in transfer through the aqueous medium.

In addition, it is also well known that UV-absorbing agents such as p-aminobenzoic acid (PABA) and its derivatives have been used for nearly half a century as UV screening agents (N. A. Shaath in "Sunscreens: Development, Evaluation, and Regulatory Aspects," N. J. Lowe and N. A. Shaath, Eds., Marcel Dekker, Inc., New York, 1990 ).

UV sunscreen agents such as PABA, however, are generally water-insoluble and there appears to be no teaching of combining such agents in carriers such that they may be used in fabric cleaning compositions.

U.S. Pat. No. 4,153,744 to K. H. Remley teaches the use of a tetrakis(hydroxymethyl)phosphonium salt to impart resistance to UV light-induced shade change to vat-dyed cellulosic textile materials. These compounds are unrelated to the copolymers used in the compositions of the invention. Further the process for delivering the compound is time-consuming and requires ammoniation of fabric followed by treatment with glacial acetic acid/hydrogen peroxide.

U.S. Pat. No. 4,788,054 to R. J. Bernhardt, et al. teaches the use of N-phenylphthalisimides as ultraviolet radiation [check] absorbers for cotton, wool, polyester, and rayon fabric. Again, these compounds are unrelated to the copolymers used in the compositions of the invention. Further, an aqueous sulfuric acid vehicle is required for deposition.

In P. C. Crews et al., Text. Chem Color, 19 (11): 21 (1987), the use of 2-hydroxy-4-dodecyloxybenzophenone, 2-hydroxy-4-octyloxybenzophenone, and 2-hydroxy-4-methoxybenzophenone as UV absorbers for museum textiles is taught. These compounds differ from those used in the compositions of the invention. Here, potentially carcinogenic perchloroethylene is required as the vehicle. Water-soluble 2-hydroxy-4-methoxybenzophenone-5-sulfonic acid was also shown to reduce dye fading of museum textiles, but with significant yellowing of fabric.

B. Milligan et al., Polym. Degrad. Stab., 10(4):335(1985), teach the use of 2,2'-dihydroxy-4-4'-bis-sulphobutyloxybenzophenone as a water-soluble ultraviolet light absorber for retarding the photo degradation of wool, but its synthesis requires the use of butanesultone, a suspected carcinogen.

None of the above-identified references make mention of soil release potential or teach materials that can be delivered in home laundry care.

U.S. Pat. Nos. 3,888,965, to S. L. Kwolek; 3,699,085 to T. A. Johnson; and 3,600,350 to S. L. Kwolek teach the synthesis of poly (p-benzamide) via homopolymerization of 4-aminobenzoylchloride hydrochloride, and German Patents Get. Offen. 2,351,892 and 2,538,143 teach the synthesis of poly (p-benzamide) via homopolymerization of 4-aminobenzoic acid in the presence of phosphates. In each of these references, the resulting poly PABA is insoluble in water, dilute acid, dilute base, and most organic solvents, rendering its application as a UV-absorbing polymer for fabric or skin care useless.

Japanese Patent Jpn. Kokai Tokkyo Koho 80,137,217 (Unitika Ltd.) teaches the synthesis of poly(ethylene terephthalate)/poly(p-benzamide) copolymers for high modulus automobile tire cords. I. F. Osipenko, et al., Vesti Akad. Navuk BSSR, Ser. Khim. Navuk; 1:105 (1980), teach the synthesis of poly(ethylene terephthalate)/poly(p-benzamide) copolymers and that the incorporation of p-aminobenzoic acid into poly(ethylene terephthalate) improves fiber-forming properties and dye ability. Neither of these patents or publications mention the use of the poly(p-benzamide)-based materials as UV absorbing agents or soil-release agents, nor do these disclosures mention that the poly( p-benzamide)-based materials are water-soluble or water dispersible.

In each of the above-identified references, the compound used differs from the copolymer used in the compositions of the invention, there is no teaching that a UV absorbing monomer can be delivered in an aqueous (e.g., fabric care) system, and there is no teaching or suggestion that the UV absorbing monomer can be used in a copolymer which imparts fade-resistance or soil-release properties.

As such, there is a need in the art for compositions comprising copolymers containing a UV-absorbing monomer copolymerized with a hydrophilic monomer which allows the UV-absorbing polymer to be delivered in an aqueous system and simultaneously provides soil release benefits.

SUMMARY OF THE INVENTION

The subject invention provides compositions comprising novel water-dispersible or water-soluble copolymers which contain at least one UV-absorbing monomer and one hydrophilic monomer component.

DETAILED DESCRIPTION OF THE INVENTION

This invention relates to compositions comprising novel water dispersible or water-soluble copolymers which contain at least one UV absorbing monomer and one hydrophilic monomer. The copolymer may optionally contain a hydrophobic monomer component to control delivery and deposition.

More specifically, the copolymers used in the compositions of the invention are intended to achieve a balance between water-solubility such that they are soluble enough to deliver a normally insoluble UV monomer to a fabric surface yet sufficiently insoluble such that the delivered monomer can stick or adsorb onto the fabric surface. To ensure that the copolymer is not so water-soluble that it cannot adsorb onto the fabric surface, a hydrophobic comonomer may be used.

Compositions

Surface Active Agents

The fabric care compositions in which the novel copolymers may be used may contain an alkali metal or alkanolamine soap of a $C_{10}$–$C_{24}$ fatty acid or they may contain one or more surface active agents selected from the group consisting of anionic, nonionic, cationic, ampholytic and zwitterionic surfactants or, finally, they may contain mixtures of any of these.

Examples of anionic synthetic detergents are salts (including sodium, potassium, ammonium and substituted ammonium salts such as mono-, di- and triethanolamine salts) of $C_9$–$C_{20}$ alkylbenzenesulphonates, $C_8$–$C_{22}$ primary or secondary alkanesulphonates, $C_8$–$C_{24}$ olefinsulphonates, sulphonated polycarboxylic acids (prepared by sulphonation of the pyrolyzed product of alkaline earth metal citrates, e.g. as described in British Patent Specification No. 1,082,179), $C_8$–$C_{22}$ alkylsulphates, $C_8$–$C_{24}$ alkylpolyglycol -ether -sulphates, -carboxylates and -phosphates (containing up to 10 moles of ethylene oxide); further examples are described in "Surface Active Agents and Detergents" (Vol. I and II) by Schwartz, Perry and Berch.

Examples of nonionic synthetic detergents are the condensation products of ethylene oxide, propylene oxide and/or butylene oxide with $C_8$–$C_{18}$ alkylphenols, $C_8$–$C_{18}$ primary or secondary aliphatic alcohols, $C_8$–$C_{18}$ fatty acid amides; further examples of nonionics include tertiary amine oxides with one $C_8$–$C_{18}$ alkyl chain and two $C_1$–$C_3$ alkyl chains. The above reference also describes further examples of nonionics.

The average number of moles of ethylene oxide and/or propylene oxide present in the above nonionics varies from 1–30; mixtures of various nonionics, including mixtures of nonionics with a lower and a higher degree of alkoxylation, may also be used.

Further types of nonionic surfactants are those derived from etherification of an alkyl or an alkylaryl alcohol with a reducing sugar. Particularly suitable examples are the alkyl polyglucosides described in U.S. Pat. No. 4,713,447 to Letton et al. and DE 3,827,534 (assigned to Henkel). A further class of nonionics particularly useful for drier sheets are the distributing agents such as those described in U.S. Pat. No. 4,421,792 to Rudy et al., hereby incorporated by reference into the subject application.

Examples of cationic surfactants include, but are not limited to the quaternary ammonium compounds such as the monoalkyltrimethyl and dialkyldimethylammonium halides or $C_1$–$C_3$ alkyl sulfate salts (i.e., methyl or ethyl sulfates), alkyl pyridinium salts and substituted immidazolinium species. Still other useful agents are the primary, secondary and tertiary amines and the condensation products of fatty acids with an alkyl polyamine (e.g., bis(amidoamine)).

Another class of cationics which are contemplated for use in the compositions of the invention are ester linked quaternary ammonium materials of the following formula:

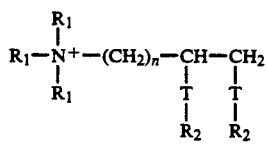

wherein each $R_1$ group is independently selected from $C_{1-4}$ alkyl, alkenyl or hydroxyalkyl groups; each $R_2$ group is independently selected from $C_{12-24}$ alkyl or alkenyl groups; T is

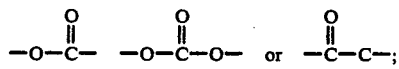

and n is an integer from 0–5.

These ester-linked quaternary ammonium materials are particularly preferred for use in fabric conditioners because they are more biodegradable than conventional quaternary ammonium materials.

Examples of amphoteric or zwitterionic detergents are N-alkylamino acids, sulphobetaines, and condensation products of fatty acids with protein hydrolysates although, owing to their relatively high costs, they are usually used in combination with an anionic or a nonionic detergent.

Mixtures of the various types of active detergents may also be used, and preference is given to mixtures of an anionic and a nonionic detergent active. Soaps (in the form of their sodium, potassium and substituted ammonium salts) of fatty acids may also be used, preferably in conjunction with an anionic and/or a nonionic synthetic detergent.

The fabric care compositions which contain copolymers comprising UV absorbing monomers may be heavy duty detergent compositions, powdered detergent compositions, fabric softener compositions or fabric drier sheet compositions.

In one embodiment of the invention, the composition is a heavy duty liquid detergent composition comprising from 1–75% by weight of a detergent-active compound, wherein the detergent active compound includes 0 to 40% of an anionic surfactant selected from the group consisting of alkyl benzene sulfonates, alkyl sulfates, and alkyl ethoxy sulfates in combination with 0 to 40% of a nonionic surfactant selected from the group consisting of alcohol alkoxylates, alkyl phenol alkoxylates, alkyl polyglucosides, and alkyl glycerol ethers; and from 0 to 30% of a detergent builder selected from the group consisting of alkali metal salts of citric acid, copolymers of acrylic and maleic acid, oxydisuccinate, tartrate monosuccinate/tartrate disuccinate, $C_8$ to $C_{18}$ carboxylic acids, zeolites, condensed phosphates, and combinations thereof.

In a preferred embodiment, the liquid detergent composition comprises, in addition to the copolymer of the invention, the following:

| | |
|---|---|
| $C_{11.5}$ (Average Alkyl Benzene Sulfonate) | 25 to 30% |
| $C_{12}$–$C_{15}$ Alcohol Ethoxylate (9 E.O.) | 10 to 14% |
| Sodium Citrate 2H$_2$O | 6 to 15% |
| Sodium Borate 10H$_2$O | 3 to 8% |
| Glycerol | 3 to 8% |
| Proteolytic Enzyme | 0.1 to 2% |
| Detergent Adjuncts | 0.1 to 10% |
| Water | balance to 100% |

In a second embodiment of the invention, the composition is a powdered detergent composition comprising. a) from 0 to about 40% anionic surfactant selected from the group consisting of alkali metal or ammonium salts of alkyl benzene sulfonates, alkyl sulfates, alkyl ether sulfates; b) from 0 to about 40% of a nonionic surfactant selected from the group consisting of alkyl alkoxylates, alkylphenol alkoxylates, alkyl polygtucosides, and alkyl glycerol ethers; c) from 5 to about 70% of a detergent builder selected from the group consisting of sodium. tripolyphosphate, sodium aluminosilicates, sodium $C_8$–$C_{18}$ alkyl carboxylates, poly(acrylic) acid and copolymers of acrylic and maleic acid, alkyl ether carboxylates, citric acid and combinations thereof; d) from 2 to abut 40% of an alkalinity buffer selected from the groups consisting of sodium silicate, sodium carbonate, and organic amines; and e) from 0 to about 40% sodium sulfate.

In a third embodiment of the invention, the composition is a fabric softener composition comprising from 2 to about 40% of a mixture comprising: a) from 0 to about 95% of a cationic ammonium salt selected from the group consisting of alkyl or alkaryl quaternary ammonium salts, alkylpyridinium salts, and substituted imidazolinium salts; b) from 0 to about 95% of primary, secondary or tertiary amines; c) from 0 to about 95% of the condensation product of a $C_8$ to $C_{18}$ alkyl carboxylic acid and an alkylpolyamine; and d) from 0 to about 40% of a polysiloxane or alkyl, alkoxy, or alkylamine modified polysiloxane.

In a fourth embodiment of the invention, the composition is a fabric drier sheet comprising: a) from 5 to 40% of a fabric softening or antistatic agent selected from the group consisting of cationic alkyl or alkaryl ammonium salts, alkyl pyridinium salts, alkyl amines, clays and poly siloxanes; b) from 2 to about 90% of a dispersing agent selected from group consisting of urea, ammonium carbonate, ethoxylated alkanols, polyethylene glycols, and block copolymers of a polyethylene glycol and polypropylene glycol; and c) a backing strip or sheet carrying said composition.

In general the surfactant used in the various fabric care compositions of the invention will comprise from about 1–75% by weight of the composition, preferably from about 20–40% by weight.

The copolymer used in the compositions of the invention may comprise from 0.01 to 10% by weight of the composition, preferably from 0.05 to 5% by weight, most preferably from 0.1–3%. It should be noted that in a standard formulation, the copolymer generally will comprise from 0.01–5%, preferably 0.1–3% of the composition but that the upper range may increase if the copolymer is included as part of a concentrate composition.

As will be apparent from some of the compositions already described above, a number of optional ingredients as are well known to those skilled in the art may be added to the fabric care compositions of the invention in addition to surfactants and the copolymer containing a UV monomer. For example, the fabric conditioning compositions may include silicones, such as predominantly linear polydialkylsiloxanes, e.g., polydimethylsiloxanes; soil release polymers such as block copolymers of polyethylene oxide and terephthalate; fatty amines selected from the group consisting of primary fatty amines, secondary fatty amines, tertiary fatty amines and mixtures thereof; amphoteric surfactants; smectite type inorganic clays; anionic soaps; zwitterionic quaternary ammonium compounds and nonionic surfactants.

The fabric conditioning compositions may also include an agent which produces a pearlescent appearance (e.g., an organic pearlizing compound such as ethylene glycol distearate, or inorganic pearlizing pigments such as microfine mica or titanium dioxide ($TiO_2$) coated mica. Other optional ingredients include emulsifiers, electrolytes (for example, sodium chloride or calcium chloride) preferably in the range from 5 to 500 ppm, optical brighteners or fluorescent agents preferably in the range from 0.01 to 5%, buffers, perfumes preferably from 0.1 to 5%, germicides, bactericides, and bacteriostatic agents. Bacteriostatic agents are preferably employed in the range from 1 to 1000 ppm, based on % active of such agent.

Similarly, if the composition is a heavy duty detergent, the compositions may include water-soluble and-/or water insoluble detergent builder salts, alkalinity buffers (e.g., monoethanolimine, triethanolimine, borax and the like), hydrotropes (e.g., ethanol, sodium xylene sulfonate, sodium cumene sulfonate and the like), clays, antisettling agents (e.g., aluminum stearate), soil-redeposition or anti-redeposition agents, optical brighteners, anti-foam agents and bactericides.

The list of optional ingredients is not intended to be exhaustive and other optional ingredients which may not be listed but are well known in the art may be included in the various compositions.

Copolymers

The copolymers used in the compositions of the invention may be defined by the following formula I:

$$-(A)_n-(B)_m-(C)_p \qquad (I)$$

wherein A is a monomer capable of absorbing ultraviolet radiation in the 280–400 nanometer (nm) range and bearing the appropriate bifunctionality for incorporation into the main chains of the polymer. Examples of such groups include planar aromatic based moieties such as aminobenzoate esters, anthranilate esters, salicylate esters, hydroxycinnamate esters, hydroxycarboalkoxybenzophenones, hydroxycarboalkoxydibenzoylmethanes, carboalkoxycinnamate esters, dihydroxy- and dicarboxyalkoxy benzophenones, dihydroxy- and dicarboxy- beznoylmethanes, dihydroxy-, dicarboalkoxy-, and hydroxycarboalkoxy- substituted betacarotenes, and dihydroxy-, dicarboalkoxy-, and hydroxycarboalkoxy substituted vitamin E derivatives;

B is a hydrophilic monomer incorporated to confer hydrophilicity to hydrophobic surfaces;

C is a hydrophobic monomer incorporated to adjust the water solubility or water dispersability and binding strength to hydrophobic surfaces;

n is at least 1 and may range from 1 to 500, preferably 50–500;

m is at least 5 and may range from 5 to 500; and p may be zero and may range from 0 to 500.

It should be noted that if A (the UV absorbing monomer) is itself water-soluble (in that there is no precipitation from aqueous solution at a concentration of about 0.01 weight percent), then p (defining the chain length of the hydrophobic monomer) should be at least 1 in order to ensure deposition of the polymer. Also, if the length of the hydrophilic monomer (B) or the percentage of B as a total percentage of copolymer is such that the resulting copolymer is too water soluble to effectively allow the UV monomer to absorb onto hydrophobic surfaces (i.e., of the fabric), then p must always be greater than 0. Specifically, p must be large enough to ensure that adsorption takes place while at the same time not So large as to preclude water dispersability. As indicated above, a careful balance must be maintained so that the copolymer is soluble enough to deliver normally insoluble UV monomer to a fabric surface yet the copolymer is sufficiently insoluble such that the delivered monomer can adsorb onto the fabric surface.

In general, the level of m is chosen to balance the water dispersability, substantivity and hydrophilic character of the deposited coating. In practice, a minimum value for m of approximately 5 is useful.

The monomer A may comprise 0.05 to 99.9 mol % of the polymer, preferably 5–75%, most preferably 20–70 mol %, the hydrophilic monomer B may comprise 0.05 to 49.9 mol % of the polymer, preferably 10 to 45%, most preferably 20–40 mol % of the polymer and the hydrophobic monomer C, if present, may comprise 0.05 to 49.9% mol % of the polymer, preferably 10 to 45%, most preferably 20–40%.

Although A, B, and C are expressed above as a copolymer, it is to be understood that the places of A, B and C may be interchanged.

The block copolymers of the invention may be further defined by the following formula II:

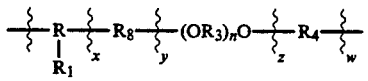

wherein:

R is a difunctional aryl or alkyl group such as, for example, difunctional benzene or naphthalene, preferably difunctional benzene or a difunctional straight or branched alkyl chain containing 4 to 16 carbon atoms;

$R_1$ is hydrogen or an aliphatic containing group having 1–20 carbons, preferably a straight-chained alkyl group having 1–12 carbons, most preferably 1 to 5 carbons, an aryl, an alkaryl, a secondary amine such as, for example, dialkylamine, an alkali metal sulfonate, an alkali metal carboxylate, an alkyl ether or a halogen atom;

$R_2$ is a straight or branch chain alkoxy group having 1 to 16 carbons, preferably 1 to 4 carbons, or an aryloxy or a substituted aryloxy group;

$R_3$ is a straight or branch chain alkyl group having 1 to 16 carbons, preferably a 1–3 carbons; and $R_4$ is a UV absorbing monomer bearing the appropriate bifunctionality for incorporation into the main chain of the polymer. By bifunctional is meant any UV absorbing monomer as defined above bearing at least the functional groups such as are well known in the art. Examples of such functional groups include, but are not limited to, amines, esters, carboxylic acids, hydroxyl groups etc.

x, which represents the number of monomeric units of the optional hydrophobic group, is selected such that the hydrophobe is present at 0–49.9 mol % of the polymer;

y is selected such that the $R_2$ group is present at 0–49.9 mol % of the polymer;

z is selected such that the $(OR_3)_n$ group is present at 0–49.9 mol % of the mixture wherein n is an integer between 2 and 200, preferably 10 to 25; and w is selected such that the $R_4$ is present at 0.05 to 99.9 mol % of the polymer.

It should be noted that w plus z must equal at least 0.05 mol %.

As discussed above, the UV absorbing monomer (represented above by $R_4$) is a moiety bearing the appropriate bifunctionality for incorporation into the main chain of the polymer. The UV-absorbing monomer should absorb in the UVB (280–320 nm) and/or the UVA range (320–400 nm). Preferred monomers are either highly conjugated and/or poly(ene) based derivatives and/or aromatic-based derivatives bearing the appropriate difunctional groups. Examples of such UVB and/or UVA absorbers which may be used include p-aminobenzoate esters, m-aminobenzoate esters, anthranilate esters, salicylate esters, 2, 3, and 4-hydroxycinnamate esters; 2,2',3,3' and 4,4'-dihydroxy and dicarboalkoxy benzophenones and isomeric mixtures thereof; 2,2', 3,3' and 4,4'-dihydroxy and dicarboalkoxydibenzoylmethanes and isomeric mixtures thereof; and 2,2',3,3', and 4,4'-dihydroxy- and dicarboalkoxydibenzalacetones. Particularly preferred is methyl 4-aminobenzoate because of its ease of preparation and commercial availability. Still other examples of UV absorbing monomers which can suitably be used by those skilled in the art may be found in Shaath, N. A. Encyclopedia of UV Absorbers for Sunscreen Products, Cosmetics and Toiletries, pp. 21–39 (March, 1987)

As discussed above, the UV absorbing monomer may be added as 0.05–99.9 mol % of the polymer, preferably 5–75% mol %, most preferably 20–70 mol %.

The hydrophilic component (represented by $R_2$ and $(OR_3)_n$) is incorporated to confer hydrophilicity to naturally hydrophobic surfaces such as soiled cotton or polyester as well as to facilitate transfer of the polymer through an aqueous medium. Hydrophilic monomers which may be used include, but are not limited to the $\alpha,\omega$-diols or alkylene glycols such as ethylene glycol, propylene glycol, butylene glycol, and mixtures of the three. Other hydrophilic monomers which may be used as $R_2$ are based on simple sugars or poly(saccharides), or $\alpha,\omega$poly(ols) which may include glucose, sucrose, sorbitol or glycerol.

In a preferred embodiment of the invention, $R_2$ is an ethylene glycol and $(OR_3)_n$ is a poly(ethylene glycol). Suitable polyethylene glycols are those manufactured by Union Carbide and sold under the CARBOWAX® tradename. Examples include CARBOWAX® 300, 600, 1000, 3350 and the like. It is not absolutely required that the ethylene glycol monomeric unit be present as part of the final copolymer although generally the molecule is present as 5-30 mol %, preferably 10-30% mol % of the polymer.

The poly(ethylene glycol), however, must be present in at least sufficient quantity to ensure that the final copolymer may be delivered through an aqueous medium. In general, this monomer is present as 5-45 mol %, preferably 20-45% of the polymer.

In general, applicants have found that the reaction works favorably when the poly(ethylene glycol) is mixed with the ethylene glycol in a molar ratio of about 1.5:1. There is no criticality to this ratio, however, and the copolymer will form within any of the broad ranges described above.

The hydrophobic monomer which may be optionally incorporated is used to adjust the water solubility and binding strength of the copolymer to hydrophobic surfaces. As noted above, this monomer should be present if the UV absorbing monomer is water-soluble or if the percentage of y plus z (i.e., hydrophilic monomer) is so high that the polymer is too water soluble to absorb onto hydrophobic surfaces. Suitable hydrophobic monomers which may be used include long chain aliphatic $\alpha,\omega$-diols, $\alpha,\omega$-diamines, or $\alpha,\omega$-dicarboxylates. Another suitable class of hydrophobic monomers includes the aromatic 4,4′-phenylenediols, 4,4′-biphenols, or 4,4′-dihydroxydiphenyl ethers, as well as the analogous dicarboxy or diamino species. Especially preferred monomers are terephthalic acid and hexanedioic acid.

These monomers are generally added as 0.05-49.9 mol % of the reaction mixture, preferably 10-45 mol %.

In one especially preferred embodiment of the invention, the UV absorbing monomer is methyl 4-aminobenzoate, the hydrophilic monomer is a mixture of poly(ethylene glycol) and ethylene glycol and the hydrophobic monomer is dimethyl terephthalic acid.

The molecular weight of the copolymers may range from oligomers of about 750 to polymers of about 100,000, preferably 1000 to 15,000, and most preferably 2000 to about 10,000. The ratio of monomers can vary broadly depending upon the end use requirements such as whether the polymer is being used for soil release, antiredeposition, or enzyme stabilization.

However, as is usual for soil release agents, some balance is generally sought between hydrophilic and hydrophobic properties. These can be fine tuned by those skilled in the art.

As mentioned above, in one embodiment of the invention, the copolymers of the present invention may be based upon the condensation product of dimethyl terephthalate, ethylene glycol, poly(ethylene glycol), and methyl 4-aminobenzoate.

The polyethylene glycol used will generally have a molecular weight ranging from about 200 to about 10,000.

These components may be combined via a 1-step transesterification reaction as set forth below:

These components may be combined via a 1-step transesterification reaction as set forth below:

Scheme 1

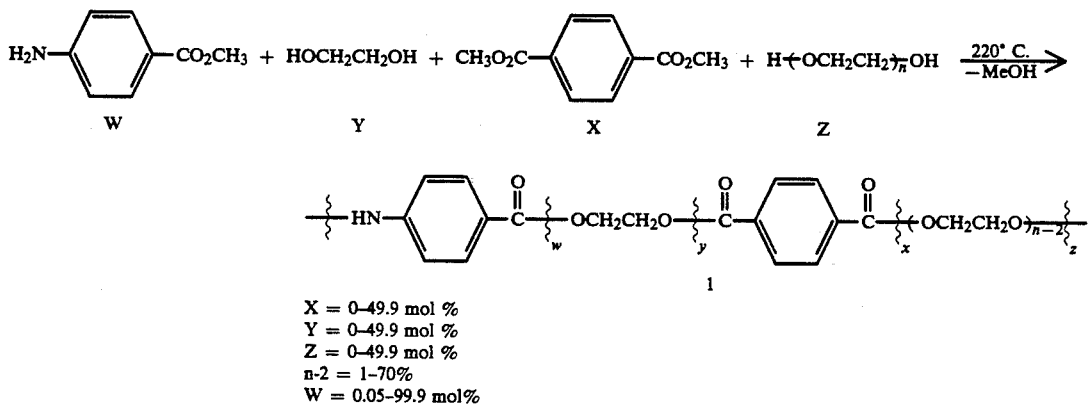

X = 0–49.9 mol %
Y = 0–49.9 mol %
Z = 0–49.9 mol %
n-2 = 1–70%
W = 0.05–99.9 mol%

According to the above scheme, the hydrophobic poly(ethylene terephthalate) unit has been incorporated to adhere the polymer to hydrophobic surfaces such as oily soil residue on cotton fabric or polyester-based fabric. The hydrophilic poly(ethylene glycol) unit has been incorporated to facilitate polymer transfer through an aqueous medium and to modify a hydrophobic surface to a more hydrophilic state, thereby deterring oily soil build-up. The methyl 4-aminobenzoate unit has been incorporated primarily to provide anti-fading benefits. The methyl 4-aminobenzoate was obtained commercially.

Polymers were obtained by charging the reaction vessel with 1 eq of dimethyl terephthalate, 2 eq. of the ethylene glycolpoly(ethylene glycol) mixture, 0.5-3 eq. of 4-aminobenzoate, and suitable catalysts such as Ca(OAc)$_2$. The contents of the reaction vessel were heated between 175°-220° C. for between 26-30 hours. The resulting materials ranged in molecular weight from 1,000-15,000 and absorbed UV light in the UVB (280-320 nm) range.

The following examples are intended to further illustrate the invention and are not intended to be limiting in any way.

EXAMPLE 1

General Procedure for Preparation of polymers

To a 250 mL 3-neck round bottom flask fitted with an overhead stirrer, distillation condenser, and nitrogen inlet tube was added 5.59 g (28.8 mmol) dimethyl terephthalate, 2.15 g (34.7 retool) ethylene glycol, 33.45 g (23.1 retool) poly(ethylene glycol) MW=1450, 6.05 g (40.0 retool) methyl $p$-aminobenzoate, 0.031 g (0.20 retool) Ca(OAc)$_2$, 0.031 g (0.11 retool) Sb$_2$O$_3$, and 0.031 g (0.14 mmol) 2,6-di-tert-butyl-4-methylphenol. The reaction vessel was purged with nitrogen and was heated at 175° C. for 2 h. The temperature was raised to 205° C., at which point MeOH began to distill off, and was heated at that temperature for 5 h. The temperature was further raised to 220° C. and heated at that temperature for an additional 19 h. The reaction mixture was allowed to cool to room temperature, where upon the polymer was removed. Optionally, the reaction mixture was allowed to cool 80° C., and was placed under vacuum (2 torr). The reaction mixture was reheated to 220° C., and was kept at that temperature for 4 h. The vacuum was removed and the reaction mixture was allowed to cool to room temperature under nitrogen.

$^1$H NMR (CDCl$_3$, 200 MHz), δ3.68 (broad s, (—CH$_2$CH$_2$O)$_{x-}$), 3.84 (t, J=4.7 Hz, —HNC$_6$H$_4$CO$_2$CH$_2$CH$_2$O—(CH$_2$CH$_2$O)$_{x-}$), 3.84 (t, J=4.7 Hz, —OCC$_6$H$_4$CO$_2$CH$_2$CH$_2$O—(CH$_2$CH$_2$O)$_{x-}$), 4.40 (t, J=4.7 Hz, —HNC$_6$H$_4$CO$_2$CH$_2$CH$_2$O—(CH$_2$C-H$_2$O)$_{x-}$), 4.49 (t, J=4.7 Hz, —OCC$_6$H$_4$CO$_2$CH$_2$C-H$_2$O—(CH$_2$CH$_2$O)$_{x-}$), 4.63 (s, —HNC$_6$H$_4$CO$_2$CH$_2$C H$_2$O$_2$CC$_6$H$_4$NH—), 4.71(s, OCC$_6$H$_4$CO$_2$CH$_2$C H$_2$O$_2$CC$_6$H$_4$CO—), 6.64 (d, J=8.0 Hz, —HNC$_6$H$_4$CO—), 7.85(d, J=8.0 Hz, —HNC$_6$H$_4$CO—), 8.11 (s, —OCC$_6$H$_4$CO—).

EXAMPLE 2

Preparation and Characterization of Polymers by GPC and UV Spectrophotometry

A series of poly(ethylene terephthalate)/poly(oxyethylene terephthalate)/poly(p-benzamide) polyamide/esters were synthesized according to the procedure described in Example 1. Samples were characterized by UV spectroscopy and gel permeation chromatography (GPC), using chloroform as the solvent. Molar extinction (ε was calculated based upon the Beer's Law equation ε=A/cl, where A=absorbance as measured by the UV spectrometer, l=path length, and c=the molar concentration. In the case of these polymers, molarity was based upon the molecular weight of the average repeating unit. The results are presented below in Table 1:

TABLE 1

| Polymer | MW | λ max | PEG MW | PABA (mol.eg.) | ε(l/mol-cm) |
|---|---|---|---|---|---|
| A | 1,000 | 284 nm | 600 | 0.60 | 4,900 |
| B* | 4,800 | 286 nm | 600 | 0.20 | 4,600 |
| C* | 2,700 | 286 nm | 600 | 0.50 | 7,900 |
| D | 2,600 | 286 nm | 600 | 0.50 | 7,000 |
| E | 2,000 | 286 nm | 600 | 0.60 | 8,400 |
| F* | 11,300 | 286 nm | 1,450 | 0.20 | 3,400 |
| G* | 9,000 | 285 nm | 1,450 | 0.33 | 7,500 |
| H | 6,700 | 283 nm | 1,450 | 0.50 | 8,800 |
| I* | 6,800 | 284 nm | 1,450 | 0.50 | 6,500 |
| J* | 9,100 | 286 nm | 1,450 | 0.50 | 6,000 |
| K | 5,800 | 284 nm | 1,450 | 0.60 | 8,900 |
| L* | 5,600 | 284 nm | 1,450 | 0.60 | 8,900 |
| M | 11,700 | 281 nm | 3,350 | 0.50 | 8,900 |
| N | 11,100 | 283 nm | 3,350 | 0.60 | 10,700 |
| O | 1,700 | 283 nm | 600 | 0.50 | 5,300 |
| P | 13,700 | 280 nm | 3,400 | 0.50 | 7,770 |

*Vacuum employed
MW = moleculer weight as determined by gel permeation chromotography (GPC)
λ max = wave-length (namometers) of maximum absorbance
PEG MW = poly(ethylene glycol) molecular weight as specified by supplier
PABA = methyl 4-aminobenzoate
ε = extinction (i.e. A/cl) as defined by Beer's Law

EXAMPLE 3

Anti-Fading Evaluation: Polymer Delivery Via Chloroform Vehicle Onto Green Cotton Solutions of anti-fade polymers of the present invention were prepared by dissolving 2 g of anti-fade polymer in 50 g of chloroform. Solutions were sprayed from a Humbrol Spray Gun onto 10×15 cm swatches of green cotton. Approximately 0.04 g of the anti-fade polymers were deposited onto each test cloth. The test swatches were exposed to simulated solar radiation via an Atlas Ci65a Weather-O-meter for 45 h. The spectral output (xenon arc radiation filtered through borosilicate glass) approximates Miami (25°46' north latitude) daylight. Test conditions meet BS 1006 and DIN standards for light fastness testing. Anti-fade protection was assessed by reflectance spectroscopy using an ICS Micromatch Reflectance Spectrophotometer. The percent anti-fade protection was calculated as the change in reflectance (Ks) from the untreated to the treated cloths, relative to the untreated cloths, i.e., % Anti-fade protection=(Ks untreated−Ks treated)÷Ks untreated The results for green cotton are shown below in Table 2:

TABLE 2

| Polymer | MW | PEG MW | PABA (mol. eg.) | % Anti-Fade Protection |
|---|---|---|---|---|
| D | 2,600 | 600 | 50 | 24.8 |
| E | 2,000 | 600 | 60 | 30.0 |
| H | 6,700 | 1,450 | 50 | 18.6 |
| P | 13,700 | 3,400 | 50 | 2.6 |
| K | 5,800 | 1,450 | 60 | 11.2 |
| A | 1,000 | 600 | 60 | 18.1 |
| O | 1,700 | 600 | 50 | 16.8 |
| C | 2,700 | 600 | 50 | 30.1 |

This Example shows that, of the polymers from Table 1 tested, anti-fade protection ranging from 2.6-30% increases were found. The Example shows that a UV absorbing monomer can be incorporated into a water-dispersible or water-soluble copolymer which can be used in a solvent vehicle and that the copolymer will provide anti-fading effect.

The polymers cause no noticeable staining of the fabric.

It should be noted that the not all polymers of Table 1 were tested but that the polymers of Table 2 were selected as representative examples having an adequate distribution of molecular weight and PABA loading.

EXAMPLE 4

Anti-Fading Evaluation: Polymer Delivery Via Chloroform Vehicle Onto Blue Polyester Solutions of anti-fade polymers of the present invention were prepared by dissolving 2 g of anti-fade polymer in 50 g of chloroform. Solutions were sprayed from a Humbrol Spray Gun onto 10×15 cm swatches of blue polyester. Approximately 0.04 g of the anti-fade polymers were deposited onto each test cloth. The test swatches were exposed to simulated solar radiation via an Atlas Ci65a Weather-O-Meter for 45 h. The spectral output (xenon arc radiation filtered through borosilicate glass) approximates Miami (25°46' north latitude) daylight. Test conditions meet BS 1006 and DIN standards for light fastness testing. Anti-fade protection was assessed by reflectance spectroscopy using an ICS Micromatch Reflectance Spectrophotometer. The percent anti-fade protection was calculated as the change in reflectance (Ks) from the untreated to the treated cloths, relative to the untreated cloths, i.e., % Anti-fade protection=Ks untreated−Ks treated)÷Ks untreated The results for blue polyester are shown below in Table 3:

TABLE 3

| Polymer | MW | PEG MW | PABA (mol. eg.) | % Anti-Fade Protection |
|---|---|---|---|---|
| H | 6,700 | 1,450 | 0.50 | 3.6 |
| A | 1,000 | 600 | 0.60 | 3.2 |
| O | 1,700 | 600 | 0.60 | 2.1 |
| C | 2,700 | 600 | 0.60 | 8.3 |

This example again shows that a UV absorbing monomer can be incorporated into a solvent vehicle and impart anti-fading effect. The selection of polymers in Table 3 was made on the basis of effectiveness from the results of Table 2.

EXAMPLE 5

Anti-Fading Evaluation: Polymer Delivery Via a Rinse Conditioner Formulation onto Blue Polyester Rinse conditioners containing 5% w/w Arquad 2HT (dihardened tallow dimethylammonium chloride) softener and 2.5% w/w anti-fade polymer were prepared by adding a neat mixture of the melted solids to 70° C. water with vigorous agitation. These fabric care formulations were used at a concentration of 4 g/L on 10 g swatches of blue polyester. The rinse treatment was carried out in a terg-o-tometer at 60 rpm with 21° C. demineralized water for 5 min. The polyester fabric pieces were spun and line dried. These test swatches were exposed to simulated solar radiation via an Atlas Ci65a Weather-O-Meter for 45 h. The spectral output (xenon arc radiation filtered through borosilicate glass) approximates Miami (25°46' north latitude) daylight. Test conditions meet BS 1006 and DIN standards for light fastness testing. Anti-fade protection was assessed by reflectance spectroscopy using an ICS Micromatch Reflectance Spectrophotometer. The percent anti-fade protection was calculated as the change in reflectance (Ks) from the untreated to the treated cloths, relative to the untreated cloths, i.e., % Anti-fade protection=(Ks untreated−Ks treated)÷Ks untreated The results for blue polyester are shown below in Table 4:

TABLE 4

| Polymer | MW | PEG MW | PABA (mol. eg.) | % Anti-Fade Protection |
|---|---|---|---|---|
| H | 6,700 | 1,450 | 0.50 | 14.9 |
| A | 1,000 | 600 | 0.60 | 1.8 |
| O | 1,700 | 600 | 0.50 | 3.4 |
| C | 2,700 | 600 | 0.50 | 3.0 |

This Example is similar to Example 5 and demonstrates that a UV absorbing monomer can be incorporated into a fabric care composition and can impart anti-fading effect.

In Table 3, delivery of the solvent was via a chloroform solvent while, in this table, delivery was via a rinse conditioner in a wash.

EXAMPLE 6

Soil Release Evaluation: Polymer Delivery via a Rinse Conditioner Formulation Onto Virgin (Undyed) Polyester Rinse conditioners containing 5% w/w dihardened tallow dimethylammonium chloride softener (Arquad 2HT) and 1% w/w anti-fade polymer were prepared by adding a neat mixture of the melted solids to 70° C. water with vigorous agitation. These fabric care formulations were used at a concentration of 2mL/L on 3"×10" swatches of virgin polyester. The rinse treatment was carried out in a terg-o-tometer at 60 rpm with 21° C. demineralized water for 5 min. The polyester fabrics were line dried. The test cloths were stained with a 100 μL solution of 0.06% w/w sudan red in olive oil, and left to wick for four days. Baseline reflectance data were obtained using an ICS Micromatch Reflectance Spectrophotometer. The test cloths were rewashed in a terg-o-tometer at 40° C. with 5 g/L of a commercially available laundry detergent for 15 min., rinsed at 21° C. for 5 min., and line dried. Soil release benefit from the anti-fade polymers was assessed by redetermining reflectance. The percent detergency (i.e., soil release) was calculated as the change in reflectance (Ks) from the cloths before to the cloths after rewashing, relative to the cloths before rewashing, i.e., % Detergency=(Ks before−Ks after)÷Ks before The results for virgin polyester are shown below in Table 5:

TABLE 5

| Polymer | MW | PEG MW | PABA (mol. eg.) | % Detergency |
|---|---|---|---|---|
| D | 2,600 | 600 | 0.50 | 81 |
| E | 2,000 | 600 | 0.60 | 74 |
| H | 6,700 | 1,450 | 0.50 | 85 |
| P | 13,700 | 3,400 | 0.50 | 36 |
| K | 5,800 | 1,450 | 0.60 | 86 |
| A | 1,000 | 600 | 0.60 | 42 |
| O | 1,700 | 600 | 0.50 | 50 |
| C | 2,700 | 600 | 0.50 | 94 |

This example shows that the novel copolymer of the invention can be used not only to impart anti-fading effect, but that is simultaneously imparts soil-release effect when the copolymer is incorporated in a fabric composition.

EXAMPLES 7-11

Use of copolymers of the Invention in Heavy Duty Liquid (HDL) Compositions.

| Ingredient | wt. % | | | | |
|---|---|---|---|---|---|
| | 7 | 8 | 9 | 10 | 11 |
| Sodium C11–C15 Alkyl Benzene Sulfonate | 10.0 | 17.0 | 26.0 | 15.0 | 11.6 |
| Sodium Alkyl Ethoxy Sulfate (2) | 6.0 | — | — | — | 8.2 |
| Alcohol Ethoxylate (1) | 8.0 | 7.0 | 12.0 | 5.0 | 4.2 |
| Sodium Citrate | 7.0 | 7.0 | 10.0 | — | 5.0 |
| Sodium Salt of C12–C18 Fatty Acid | — | — | — | — | 3.6 |
| Sodium tartrate mono and disuccinate | — | — | — | — | 3.1 |

-continued

| Ingredient | 7 | 8 | 9 | 10 | 11 |
|---|---|---|---|---|---|
| Monoethanolamine | 2.0 | 2.0 | 2.0 | — | — |
| Triethanolamine | 2.0 | 2.0 | 2.0 | — | — |
| Sodium Silicate | — | — | — | 2.5 | — |
| Savinase | 0.75 | — | 0.75 | — | 0.4 |
| Sodium Borate | 3.5 | — | 3.5 | — | — |
| Sodium Formate | — | — | — | — | 1.2 |
| Glycerol | — | — | 5.0 | — | — |
| Propylene Glycol | 4.0 | — | — | — | 4.5 |
| Sodium Xylene Sulfonate | 3.0 | 3.0 | — | 1.0 | 2.3 |
| Ethanol | — | — | — | — | 1.0 |
| Tinopal UNPA | 0.25 | 0.25 | 0.2 | 0.1 | 0.2 |
| FW Polyester | 0.05 to 5.0 | | | | |
| Water | to 100.0 | | | | |

(1) C12 to C15 alcohol condensed with 9 mole ethylene oxide
(2) C12 to C15 alcohol condensed with 3 mole ethylene oxide and sulfated

EXAMPLES 12–16

Use of copolymers of the Invention in Heavy Duty Liquid (HDL) Compositions.

| Ingredient | 12 | 13 | 14 | 15 | 16 |
|---|---|---|---|---|---|
| Sodium C11–C12 Alkyl Benzene Sulfonate | 11.0 | 11.5 | 17.0 | 11.0 | 15.0 |
| Sodium C12–C15 Alkyl Ethoxy Sulfate (2) | — | 5.5 | — | — | — |
| Sodium C12–C15 Alkyl Sulfate | 10.0 | — | — | 9.0 | 5.0 |
| Alcohol Ethoxylate (1) | — | 3.0 | — | 2.0 | 3.0 |
| Sodium Salt of C12–C18 Fatty Acid | 1.0 | — | — | — | 1.0 |
| Sodium Tripolyphosphate | — | — | — | — | 25.0 |
| Sodium Aluminosilicate | 25.0 | 15.0 | 20.0 | 10.0 | — |
| Sodium Silicate | 3.0 | 20.0 | 5.0 | 15.0 | 15.0 |
| Sodium Carbonate | 18.0 | 18.0 | 15.0 | 30.0 | 20.0 |
| Savinase | 0.5 | 0.5 | 0.5 | 0.5 | 1.0 |
| Tinopal AMS | 0.15 | 0.2 | 0.25 | 0.15 | 0.15 |
| FW Polyester | 0.05 to 5.0 | | | | |
| Sodium Sulfate | to 100.0 | | | | |

(1) & (2) same as HDL compositions

EXAMPLES 17–19

Use of copolymers of the Invention in Heavy Duty Liquid (HDL) Compositions.

| Ingredient | 17 | 18 | 19 |
|---|---|---|---|
| Dimethyldialkyl ammonium chloride | 3.2 | 6.5 | 6.25 |
| Trimethylalkyl ammonium chloride | 0.6 | 0.9 | — |
| Alkyl amidoethyl alkyl imidazoline | 3.3 | 16.0 | — |
| Polydimethyl siloxane | 0.1 | 0.5 | — |
| Ethanol | 0.7 | 1.4 | — |
| Calcium chloride | 0.1 | 0.3 | 0.1 |
| FW Polyester | 0.05 to 5.0 | | |
| Water | to 100.0 | | |

We claim:

1. A heavy duty detergent composition comprising:
   (a) about 20 to about 75% by weight of a surfactant selected from the group consisting of soap, nonionic surfactant, anionic surfactant, ampholytic surfactant, zwitterionic surfactant, cationic surfactant and mixtures thereof; and
   (b) about 0.01 to 10% by weight of a water-soluble or water-dispersible copolymer comprising a UV-absorbing monomer (absorbing in the 280–400 monomer range) and a hydrophilic group;

wherein said copolymer has the formula:

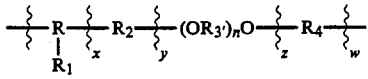

wherein

R is a difunctional aryl group or a difunctional straight or branched alkyl chain having 4 to 16 carbons;

$R_1$ is hydrogen, an aliphatic group having 1–20 carbons, an aryl, alkaryl, a secondary amine, an alkali metal sulfonate, an alkali metal carboxylate, an alkyl ether or a halogen atom;

$R_2$ is a straight or branch chain alkoxy group having 1 to 16 carbons, an aryl or a substituted aryl group;

$R_3$ is a straight or branch chain alkyl group having 1 to 16 carbons;

$R_4$ is a UV-absorbing monomer absorbing in the UVB (280–320 nm) and/or UVA (320–400 nm) range;

x is selected such that the hydrophobe is present at 0–49.9 mol % of the polymer;

y is selected such that the $R_2$ group is present at 0–49.9 mol % of the polymer;

z is selected such that the $(OR_3)_n$ group is present at 0 to 49.9 mol % of the polymer wherein n is an integer between about 12 and 200;

w is selected such that $R_4$ is present at 0.05 to 99.9 mol % of the polymer;

and w plus z equal at least 0.05 to 99.9 mol % of the polymer;

and w plus z equal at least 0.05 mol %.

2. A composition according to claim 1, wherein R is a difunctional benzene or naphthalene.

3. A composition according to claim 1, wherein $R_1$ is hydrogen or a straight chain alkyl group having 1 to 12 carbon atoms.

4. A composition according to claim 1, wherein $R_2$ is an alkoxy group having 1–4 carbons.

5. A composition according to claim 1 wherein R is

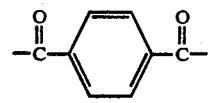

and $R_1$ is hydrogen.

6. A composition according to claim 1 wherein $R_2$ is —OCH$_2$CH$_2$—.

7. A composition according to claim 1, wherein $R_3$ is —CH$_3$CH$_2$—.

8. A composition according to claim 1 wherein $R_4$ is

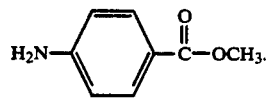

9. A composition according to claim 1 wherein R is

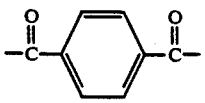

$R_2 = -OCH_2CH_2-$;
$R_3 = -CH_2CH_2-$; and
$R_4$ is a highly conjugated and/or poly(ene)-based derivative and/or aromatic based derivative bearing a difunctional group.

10. A composition according to claim 1 wherein R is

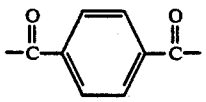

$R_2 = -OCH_2CH_2-$;
$R_3 = -CH_2CH_2-$; and

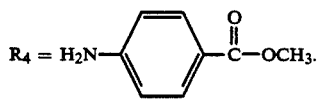

11. A composition according to claim 1 prepared by polymerizing a mixture of dimethyl terephthalate, ethylene glycol, polyethylene glycol of MW 200-3000 and methyl 4-aminobenzoate.

12. A composition according to claim 1 comprising: from about 20 to 75% by weight of a detergent active compound, wherein the detergent active includes 1 to 40% of an anionic surfactant selected from the group consisting of alkyl benzene sulfonates, alkyl sulfates, and alkyl ethoxy sulfates in combination with 1 to 40% of a nonionic surfactant selected from the group consisting of alcohol alkoxylates, alkyl phenol alkoxylates, alkyl polyglucosides, and alkyl glycerol ethers; and
from 0 to 30% of a detergent builder selected from the group consisting of alkali metal salts of citric acid, copolymers of acrylic and maleic acid, oxydisuccinate, tartrate monosuccinate/tartrate disuccinate, $C_8$ to $C_{18}$ carboxylic acids, zeolites, condensed phosphates, and combinations thereof.

13. A composition according to claim 15 comprising:

| | |
|---|---|
| $C_9$–$C_{20}$ [$C_{11.5}$ Average] Alkyl Benzene Sulfonate | 25 to 30% |
| $C_{12}$–$C_{15}$ Alcohol Ethoxylate (9 E.O.) | 10 to 14% |
| Sodium Citrate 2 $H_2O$ | 2 to 15% |
| Sodium Borate 10 $H_2O$ | 3 to 8% |
| Glycerol | 3 to 8% |
| Proteolytic Enzyme | 0.1 to 2% |
| Detergent Adjuncts | 0.1 to 10% |
| Water | balance to 100%. |

14. A powdered detergent composition comprising:
(a) about 17 to about 75% by weight of a surfactant selected from the group consisting of soap, nonionic surfactant, anionic surfactant, ampholytic surfactant, zwitterionic surfactant, cationic surfactant and mixtures thereof; and
(b) about 0.1 to 10% by weight of a water-soluble, or water dispersible copolymer comprising a UV-absorbing monomer (absorbing in the 280-400 nm range) and a hydrophilic group.

15. A composition according to claim 14 comprising:
a) from 1 to about 40% anionic surfactant selected from the group consisting of alkali metal or ammonium salts of alkyl benzene sulfonates, alkyl sulfates, alkyl ether sulfates; b) from 1 to about 40% of a nonionic surfactant selected from the group consisting of alkyl alkoxylates, alkylphenol alkoxylates, alkyl polyglucosides, and alkyl glycerol ethers; c) from 5 to about 70% of a detergent builder selected from the group consisting of sodium tripolyphosphate, sodium aluminosilicates, sodium $C_8$–$C_{18}$ alkyl carboxylates, poly(acrylic acid) and copolymers of acrylic and maleic acid, alkyl ether carboxylates, citric acid and combinations thereof; d) from 2 to about 40% of an alkalinity buffer selected from the group consisting of sodium silicate, sodium carbonate, and organic amines; and e) from 0 to about 40% sodium sulfate.

16. A composition according to claim 1, wherein the copolymers further comprises a hydrophobic group.

17. A fabric softener composition comprising:
(a) about 6.25 to about 75% by weight of a cationic ammonium salt selected from the group consisting of alkyl or alkaryl quaternary ammonium salts, alkylpyridium salts and substituted imidazolinium salts; and
(b) about 0.1 to 10% by weight of a water-soluble or water dispersible copolymer comprising a UV-absorbing monomer (absorbing in the 280-400 nm range) and a hydrophilic group.

18. A composition according to claim 17, comprising from 2 to about 40% of a mixture comprising: a) from 1 to about 95% of a cationic ammonium salt selected from the group consisting of alkyl or alkaryl quaternary ammonium salts, alkylpyridinium salts, and substituted imidazolinium salts; b) from 0 to about 95% of primary, secondary or tertiary amines; c) from 0 to about 95% of the condensation product of a $C_8$ to $C_{18}$ alkyl carboxylic acid and an alkylpolyamine; and d) from 0 to about 40% of a polysiloxane or alkyl, alkoxy, or alkylamine modified polysiloxane.

19. A composition according to claim 18, wherein the cationic softener is an ester-linked quaternary material having the formula

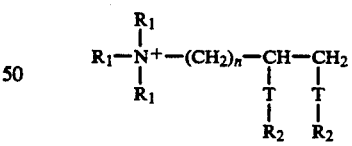

wherein each $R_1$ group is independently selected from $C_{1-4}$ alkyl, alkenyl or hydroxyalkyl group, each $R_2$ group is independently selected from the group consisting of $C_{12-24}$ alkyl or alkenyl groups; T is

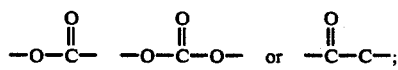

and
n is an integer from 0-5.

20. A composition according to claim 17 comprising:
(a) from about 6.25 to 40% of a fabric softening or antistatic agent selected from the group consisting of cationic alkyl or alkaryl ammonium salts, alkyl pyridinium salts, alkyl amines, clays and poly silixanes; and
(b) from 2 to about 90% of a dispersing agent selected from the group consisting of urea, ammonium carbonate, ethoxylated alkanols, polyethylene glycols, and block copolymers of a polyethylene glycol and polypropylene glycol.

* * * * *